Oct. 26, 1937.  W. G. LA PIERRE  2,097,295
TROLLING AND CASTING REEL
Filed June 22, 1935  2 Sheets-Sheet 1
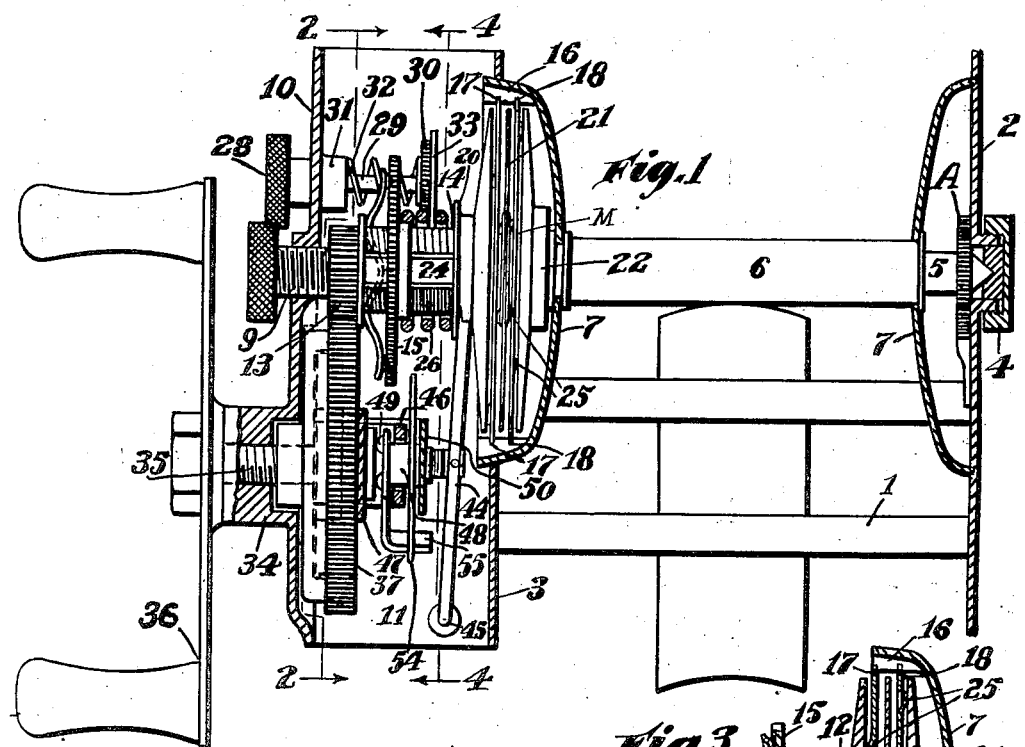
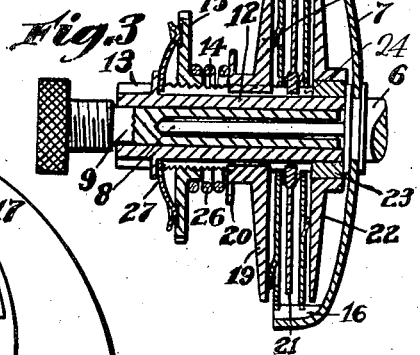
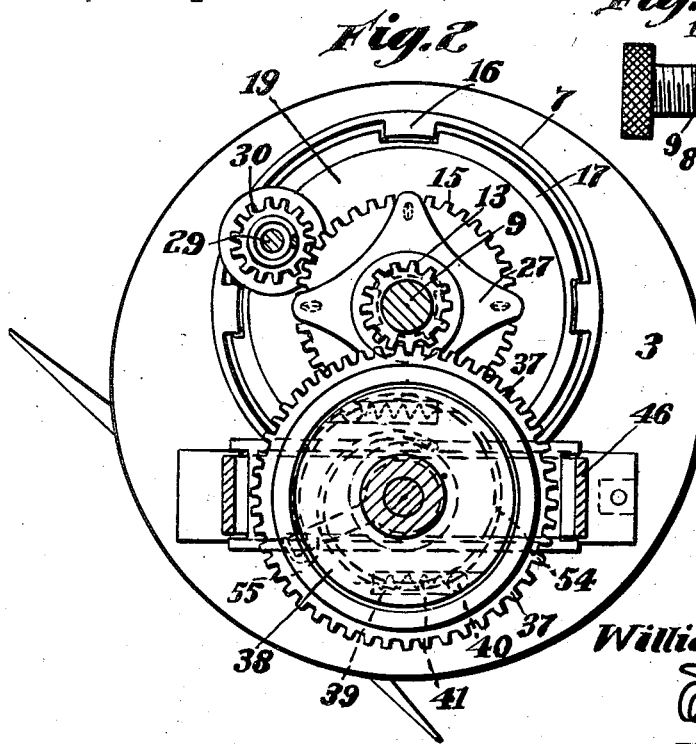
Inventor
William G. La Pierre
By Attorney Oct. 26, 1937.  W. G. LA PIERRE  2,097,295
TROLLING AND CASTING REEL
Filed June 22, 1935  2 Sheets-Sheet 2
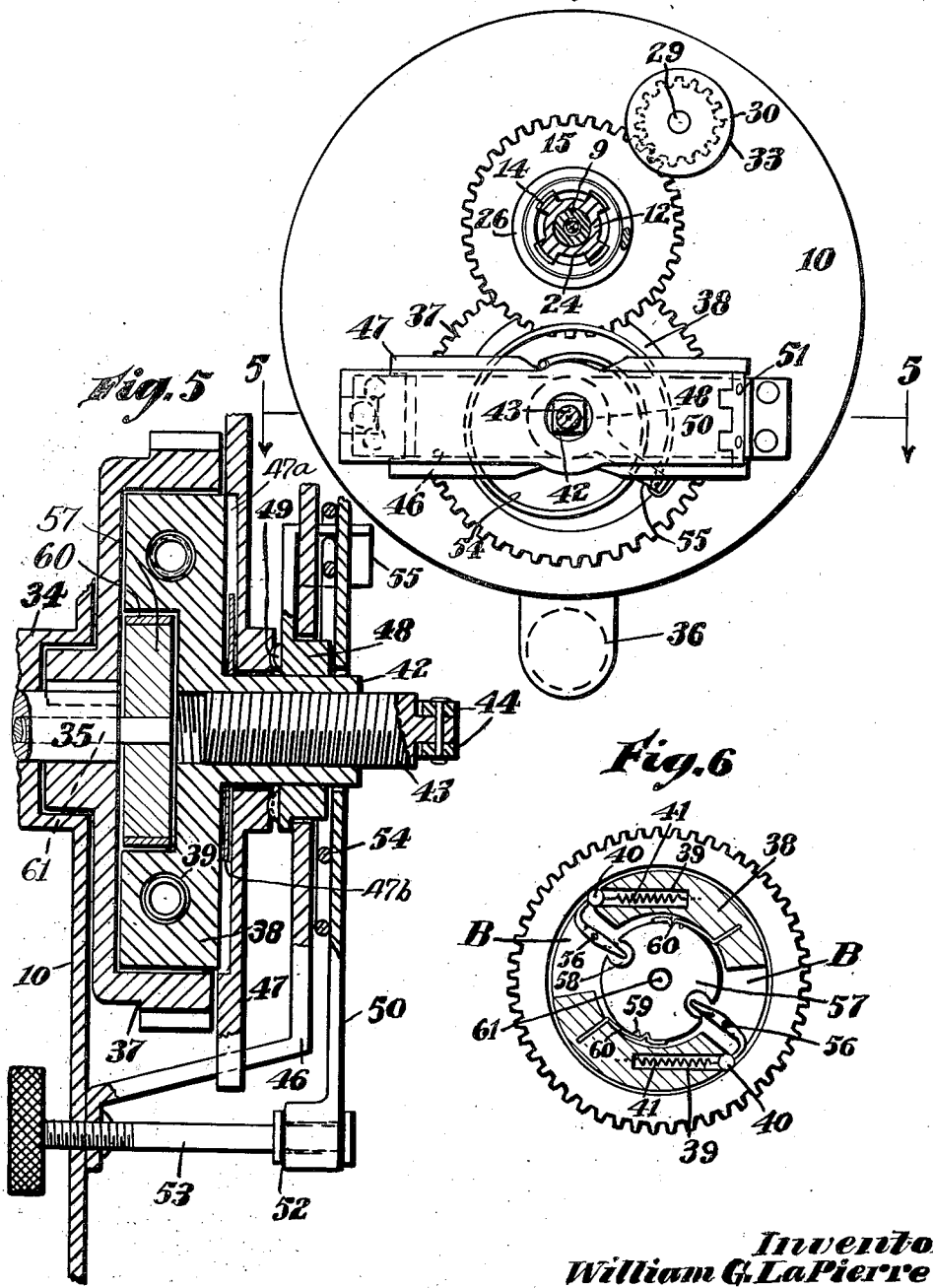

Patented Oct. 26, 1937

2,097,295

UNITED STATES PATENT OFFICE 2,097,295

TROLLING AND CASTING REEL

William G. La Pierre, Greenville, N. H.

Application June 22, 1935, Serial No. 27,903

21 Claims. (Cl. 242—84.5)

My invention relates to improvements in casting reels of the free spooled type.

Many interesting developments have been made in casting reels which have resulted in their widespread use. This has been due to the provision of mechanisms insuring the level winding of the line and the prevention of back lashes when a cast is made. These features, while permitting successful use of this type of equipment by those lacking skill and experience, have had the objectionable feature of limiting further the efficiency of the reel.

The experienced and expert fisherman usually adapts his fishing technique to his characteristics. This may be evidenced by such extreme examples as the tendency to stress distance in casting or the tendency to use the lightest equipment consistent with the general types of game fish sought.

I have provided a reel, which, while serviceable for all purposes, is particularly adapted to satisfy all requirements of experts. I have provided a reel in which, when desired, the reel is completely freed from all driving or driven mechanism permitting the other equipment used to determine the maximum casting distance. This is effected by providing a clutch to connect the spool with the driving mechanism. This clutch may be adjusted to slip at any predetermined pull on the line not only preventing line breakage when the line is "snagged", but also making it possible to use a light rod and line without the probability of straining the equipment. A secondary mechanism is adapted to be picked up by the driving mechanism when actuated to pay out line. This mechanism disengages the first clutch and it may be adjusted to control that clutch as desired so that provision may be made for an infinite range of operating or fishing conditions.

It will be appreciated that I have suggested these conditions broadly, and while, as above stated, having special reference to the requirements of experienced and expert anglers, my invention is equally effective if used for general purposes.

In the drawings I have shown and in the specification described an embodiment of my invention and throughout the drawings and specification, like reference numerals indicate corresponding parts.

In the drawings:

Fig. 1 is a partly sectioned front view of a reel embodying my invention.

Fig. 2 is a section through my reel along the lines 2—2, of Fig. 1.

Fig. 3 is a view showing in detail the clutch connecting the spool and the driving mechanism.

Fig. 4 is a section through the reel along the line 4—4, of Fig. 1.

Fig. 5 is an enlarged partly sectioned view of the clutch releasing mechanism along the line 5—5, of Fig. 4, and Fig. 6 is a partly sectioned view of a lock by which the clutch releasing mechanism may be controlled.

In Fig. 1 I have shown a typical reel consisting of a frame 1 to which are secured the plates 2 and 3. The plate 2 is provided with an adjustable bearing indicated at 4 for the shaft 5 of the spool 6 which is provided with concave flanges 7. The plate 3 is apertured to receive one of the flanges 7 while the shaft 8 of the spool 6 is supported by the bearing 9 which is threaded through the head plate 10 for adjustment. The head plate 10 is supported as by the wall 11 holding the head plate 10 to the plate 3.

I have not described in detail my reel as to its general construction for it will be understood that the construction is generally similar to standard types. That is, while I have shown a gear A on the shaft 5 such as may be used to provide a desired click mechanism, as this plays no part in my invention and is not necessary for its appreciation, I have not shown or described it fully.

*The spool driving mechanism*

As is shown most clearly in Fig. 3, I mount on the bearing 9 an independently rotatable sleeve 12 which includes a gear portion 13 and a threaded portion 14 on which is threaded a gear 15.

The flange 7 is provided with splines 16 which hold clutch discs 17 and 18 against rotation. The discs 17 and 18 are loosely mounted on the sleeve 12, but are adapted to be rotated therewith as will presently be explained.

A slidable plate 19 having a flanged hub 20 is adapted to bear against the clutch disc 17 which is separated from the disc 18 by the plate 21 while a cap 22 is threaded on the end of the sleeve 12 and held by the splines 23 in the grooves 24 in which the plates 19 and 21 are fitted to permit them to slide, but preventing their rotation so that an engagement of the members may be effected to turn the spool 6 with the sleeve 12. The discs are provided with suitable springs 25 (see Figs. 1 and 2).

A spring 26 is positioned between the gear 15 and the hub 20 while a spring 27 keyed to the sleeve 12 is adapted to hold the gear 15 in any desired position.

The gear 15 may be positioned to adjust the tension of the spring 26 to secure a desired engagement of the clutch members. This will generally be such an engagement as will be effective to permit slippage of the clutch on a predetermined pull on the line. The tension of the spring 27 may be varied by pulling out the head 28 of the shaft 29 carrying the gear 30 until the gears 30 and 15 are in mesh. The shaft 29 is supported in a guide block 31 on the inner surface of the head plate 10. A spring 32 between the block 31 and the gear 30 carries the gear 30 out of position after adjustments have been made, while the flange 33 ensures proper meshing of the gears 15 and 30 when the head is pulled out.

A hub 34 on the head plate 10 is apertured to receive the shaft 35 to which the handle 36 is secured. The shaft 35 carries the gear 37 in mesh with the gear 13.

*The clutch releasing or secondary mechanism*

The gear 37 is provided with a recess in which I position a member 38. The member 38 is adapted to be rotated with the gear 37 when the gear is rotated to pay out line (counterclockwise as viewed in Fig. 2). This engagement may be effected by boring the member 38 as at 39 and subjecting the balls 40 to the influence of the springs 41.

The member 38 is provided with a square hub 42 internally threaded to receive a bolt member 43 to which is pivoted the lever 44 fulcrumed as at 45 to the wall 11. The lever 44 is forked to lie between the flange of the hub 20 and the plate 19.

As may be most clearly seen in Fig. 5, a frame 46 is secured to the inner surface of the head plate 10. The frame 46 slidably carries a brake member 47 apertured to permit the free rotation of the hub 42 and recessed at 47ᵃ so that it will contact the gear 37 and not affect the member 38. A thrust washer 47ᵇ is positioned between the member 38 and the brake member 47. The brake member 47 and the collar 48 are provided with cam surfaces indicated as at 49, that are adapted to be interengaged so that after a predetermined partial rotation of the collar 48, which has a square aperture to cause rotation with the hub 42, it will be locked to the brake member 47 which will be forced against the gear 37 to hold the gear 37 to which the member 38 is locked until the gear 37 is rotated in the opposite direction. The spool will be either completely freed or retarded by the main clutch M (Fig. 1) comprising the clutch plates 17, 18, 21, the cap 22 and the slidable plate 19 which now acts as a brake. The extent of the clutch disengagement will depend on the extent to which the bolt 43 has been drawn into the member 38.

To permit this action to be controlled as desired I have hinged a plate 50 to the frame 46 as at 51. The plate 50 is apertured to overlie the hub 42 and to bear against the collar 48. The other end of the plate 50 is provided with a swivel indicated as at 52 connecting it to a shaft 53 threaded through the head plate 10 so that the position of the collar 48 may be varied on the hub 42 to effect a desired engagement of the cam surfaces 49.

A coiled spring 54 anchored to the plate 50 between the frame 46 and the plate 50 is secured to the bent arm 55 of the collar 48 so that as the collar 48 is rotated, the spring 54 is tightened and when the member 38 is freed by turning the handle to rotate the gear 37 in a direction effective to reel in the line, the spring 54 will rotate the member 38 and restore the lever 44 to its original position.

In Fig. 6, I have shown a lock to prevent the clutch member 38 from being actuated by rotation of the gear 37. The member 38 is recessed as at B adjacent the ends of the bores 39 and in the recesses B the latches 56 are pivoted. A cam member 57 is adapted to carry the latches 56 into or out of position to confine the balls 40 within the bores 39 depending on whether the cam 57 is turned to the right or to the left. The cam member 57 is formed with recesses 58 for the ends of the latches 56 and recesses 59 into which the spring catches 60 are adapted to enter when the cam 57 has been turned to the desired position. The member 57 is provided with a shaft 61 that may extend through an opening in the shaft 35 for the handle 36 and may be provided with a handle to turn the shaft 61 to facilitate the control of the latches 56.

In considering the operation of my invention it will be assumed that the fisherman has adjusted the main clutch connecting the sleeve 12 to the spool 6 so that it will slip on a predetermined pull. It will also be assumed that the member 53 has been adjusted so that the clutch releasing mechanism has been adjusted to free the spool 6 completely from the driving mechanism when the spool 6 is rotated to pay out line. The driving mechanism includes the crank 36, the gear 37, the gear 13, and the sleeve 12 on which the main clutch is carried. The clutch releasing or secondary mechanism includes the lever 45, the shaft 43, the collar 48, and the spring 54 rotating the collar 48 and the shaft 43 to effect a reengagement of the main clutch and the hinged plate 50 positioned by the member 53 to control the position of the collar 48 to secure a desired engagement of the cam surfaces indicated at 49 on the collar 48 and the brake member 47.

The operation of the clutch releasing mechanism may most clearly be understood by a consideration of the operation of my invention when a cast is made. The gear 37 immediately picks up the member 38 through the one way clutches and the bolt 43 is drawn in to cause the lever 44 to disconnect the main clutch. The rotation of the member 38 also rotates its collar 48 causing an interlock of the cams 49 and a thrust of the brake member 47 against the gear 37. That is, while the spring 54 will return the clutch releasing mechanism, a brake is provided which is released only by turning of the handle in a direction to reel in line.

When line is being reeled in, or the clutch releasing mechanism is disconnected from the gear 37 and the handle is held, the main clutch will slip on a predetermined pull, such as that exerted by a heavy fish, or that caused by the hook having become snagged.

It will thus be seen that either turning the handle to the left or pulling out line is effective to actuate the clutch releasing mechanism, the adjustment of which will determine whether or not the spool will be entirely freed. If the clutch is to be automatically released as the cast is made, the spool, first retarded by driven mechanism, is rapidly freed so that its speed of rotation will depend more entirely on the speed of the object cast.

Such a reel as I contemplate has strength which ensures long service and positive action as illustrated by the large clutch area utilized.

It will be also appreciated that the handle may be turned to reel in the line at any time as the clutch will slip if the strain on the line is excessive and as the clutch releasing mechanism may be locked out of operation, I am able to provide a reel useful for general purposes as well as permitting maximum casts and minimizing strains on rod and line.

What I therefore claim and desire to secure by Letters Patent is:

1. In a fishing reel, a spool for the line, a crank controlled mechanism for rotating said spool, a clutch adapted to connect said spool and said mechanism, said clutch comprising discs substantially the size of and splined to one of the flanged ends of said spool, and members slidably carried by said mechanism in position to engage with said discs, a head on said mechanism, a spring urging said members into engagement with said discs and with said head, and adjustable means adapted to vary the tension of said spring as desired.

2. In a fishing reel, a spool for the line, a crank controlled mechanism for rotating said spool, a clutch adapted to connect said spool and said mechanism, said clutch comprising discs substantially the size of and splined to one of the flanged ends of said spool, and members slidably carried by said mechanism in position to engage with said discs, a head on said mechanism, a spring urging said members into engagement with said discs and with said head, and means to disengage said clutch.

3. In a fishing reel, a spool for the line, a crank controlled mechanism for rotating said spool, a clutch adapted to connect said spool and said mechanism, and a secondary mechanism adapted to disengage said clutch, said mechanism including a clutch adapted to be engaged by said mechanism when actuated to cause said spool to unwind said line, and an adjustable brake adapted to hold said clutch when said first named clutch has been affected as desired.

4. In a fishing reel, a spool for the line, a crank controlled mechanism for rotating said spool, a clutch adapted to connect said spool and said mechanism, and a secondary mechanism adapted to disengage said clutch, said mechanism including a clutch adapted to be engaged and rotated by said mechanism when actuated to cause said spool to unwind said line, a shaft threaded in said second named clutch, a lever adapted to be actuated by said shaft to disengage said first named clutch when said shaft is drawn into said second named clutch by rotation thereof, and a brake adapted to control the rotation of said second named clutch.

5. In a fishing reel, a spool for the line, a crank controlled mechanism for rotating said spool, a clutch adapted to connect said spool and said mechanism, and a secondary mechanism adapted to disengage said clutch, said mechanism including a clutch adapted to be engaged and rotated by said mechanism when actuated to cause said spool to unwind said line, a shaft threaded in said second named clutch, a lever adapted to be actuated by said shaft to disengage said first named clutch when said shaft is drawn into said second named clutch by rotation thereof, and an adjustable brake adapted to control the rotation of said second named clutch whereby said first named clutch may be affected as desired.

6. In a fishing reel, a spool for the line, a crank controlled mechanism for rotating said spool, a clutch adapted to connect said spool and said mechanism, and a secondary mechanism adapted to disengage said clutch, said mechanism including a clutch adapted to be engaged and rotated by said mechanism when actuated to cause said spool to unwind said line, a shaft threaded in said second named clutch, a lever adapted to be actuated by said shaft to disengage said first named clutch when said shaft is drawn into said second named clutch by rotation thereof, and a brake adapted to control the rotation of said second named clutch whereby said first named clutch may be affected as desired, and means to return said shaft and said lever when said spool is rotated to reel in said line.

7. In a fishing reel, a spool for the line, a crank controlled mechanism for rotating said spool, a clutch adapted to connect said spool and said mechanism, a secondary mechanism adapted to disengage said clutch, said mechanism including a clutch adapted to be engaged and rotated by said mechanism when actuated to cause said spool to unwind said line, and means adapted to be manually positioned to lock said last named clutch against said engagement.

8. In a fishing reel, a spool for the line, a crank controlled mechanism for rotating said spool, a clutch adapted to connect said spool and said mechanism, a secondary mechanism adapted to disengage said clutch, said mechanism including a clutch adapted to be engaged and rotated by said mechanism when actuated to cause said spool to unwind said line, means adapted to be manually adjusted to lock said last named clutch against said engagement, and means adapted to actuate said mechanism to cause the engagement of said first named clutch when said second named clutch is released from engagement.

9. In a fishing reel, a spool for the line, a crank controlled mechanism for rotating said spool, a clutch adapted to connect said spool and said mechanism, a secondary mechanism adapted to disengage said clutch, said mechanism including a clutch adapted to be engaged and rotated by said mechanism when actuated to cause said spool to unwind said line, means adapted to be manually adjusted to lock said last named clutch against said engagement, means adapted to actuate said mechanism to cause the engagement of said first named clutch when said second named clutch is released from engagement, and manually adjustable means for varying the action of said secondary mechanism.

10. In a fishing reel, a spool for the line, a crank controlled mechanism for rotating said spool, a clutch adapted to connect said spool and said mechanism, a secondary mechanism adapted to affect said clutch to permit said spool to rotate as freely as desired, and means adapted to connect said mechanisms on rotation of said spool or said crank effective to pay out line.

11. In a fishing reel, a spool for the line, a crank controlled mechanism for rotating said spool, a clutch adapted to connect said spool and said mechanism, a secondary mechanism adapted to affect said clutch to permit said spool to rotate as freely as desired, and said mechanisms including a one-way clutch effective to interengage and actuate said secondary mechanism on rotation of said spool or said crank effective to pay out line.

12. In a fishing reel, a spool for the line, a crank controlled mechanism for rotating said spool, an adjustable clutch adapted to connect said spool and said mechanism, a secondary mechanism adapted to affect said clutch, means adapted to connect said mechanisms on rotation of said spool and said crank effective to pay out line, and adjustable means in control of said second named mechanism to cause said second named mechanism to affect said clutch as desired in relation to adjustments of said clutch whereby the line paying out rotation of said spool may be subjected to two different bases of control as determined by the angler.

13. In a fishing reel, a spool for the line, a crank controlled mechanism for rotating said spool, a clutch adapted to connect said spool and said mechanism, a secondary mechanism adapted to affect said first named clutch to permit said spool to rotate as freely as desired, said last named mechanism including a brake to limit the actuation of said last named mechanism, and means adapted to connect said mechanisms on rotation of said spool or said crank effective to pay out line.

14. In a fishing reel, a spool for the line, a crank controlled mechanism for rotating said spool, a clutch adapted to connect said spool and said mechanism, a secondary mechanism adapted to affect said first named clutch to permit said spool to rotate as freely as desired, said last named mechanism including an adjustable brake to limit the actuation of said last named mechanism, and means adapted to connect said mechanisms on rotation of said spool or said crank effective to pay out line.

15. A clutch for use in connecting the spool of a fishing reel or the like to the spool rotating shaft, clutch discs slidably splined to the face of said spool, disc engaging members slidably splined on said shaft in desired relation to said discs, a head on said shaft, a driving gear on said shaft, an axially adjustable nut, a detent in control of said nut, a spring locked by said nut urging said disc engaging member and said discs into interengagement, a lever to disengage said discs and said nuts, and means to vary the tension of said spring.

16. A clutch for use in connecting the spool of a fishing reel or the like to the spool rotating shaft, clutch discs slidably splined to the face of said spool, disc engaging members slidably splined on said shaft in desired relation to said discs, a head on said shaft, a driving gear on said shaft, an axially adjustable nut, a detent in control of said nut, a spring locked by said nut urging said disc engaging member and said discs into interengagement, a lever to disengage said discs and said nuts and means to vary the tension of said spring, said means including a rotatable flanged nut engaging member, and a spring adapted to disengage said nut and said nut engaging member after desired adjustments.

17. A clutch for use in connecting the spool of a fishing reel or the like to the spool rotating shaft, said clutch comprising clutch surfaces carried by said spool and engaging means slidably splined on said shaft, a member threaded on said shaft, a spring locked by said member adapted to carry said clutch into engagement, means to disengage said clutch, and means locking said threaded member in position whereby said clutch connects said shaft and said spool without pressure between moving and stationary parts.

18. In a fishing reel, a spool for the line, a crank controlled mechanism for rotating said spool, a clutch adapted to connect said spool and said mechanism, a secondary mechanism adapted to affect said clutch to permit said spool to rotate as freely as desired, means adapted to connect said mechanisms on rotation of said spool or said crank effective to pay out line, and means to maintain said connection and to hold said crank controlled mechanism motionless until said crank is rotated to reel in said line.

19. In a fishing reel, a spool for the line, crank controlled mechanism for rotating said spool, a clutch adapted to connect said spool, and a secondary mechanism adapted to disengage said clutch, means adapted to connect said member on rotation of said spool or said crank effective to pay out line and to maintain said connection until said crank is rotated to reel in said line, said last named mechanism including a brake to hold said crank controlled mechanism motionless until manually actuated and a coiled spring to restore said clutch engagement when said mechanisms are disconnected.

20. In a fishing reel, a spool for the line, a crank controlled mechanism for rotating said spool, a clutch adapted to connect said spool and said mechanism, a secondary mechanism adapted to disengage said clutch, means adapted to connect said mechanisms on rotation of said spool or said handle to pay out line, said means comprising a pair of rotatable members and one way clutches adapted to interlock said members, one of said members being carried by each of said mechanisms, a brake adapted to hold said rotating member in said first named mechanism motionless, a member slidably carried by said rotatable member in said second named mechanism, said brake and said slidable member having interengaging cam surfaces effective on connection of said mechanism to lock said slidable member to said brake and to actuate said brake to hold said mechanism motionless, and means to restore said second named mechanism when said handle is rotated to reel in said line.

21. In a fishing reel, a spool for the line, a crank controlled mechanism for rotating said spool, a clutch adapted to connect said spool and said mechanism, a secondary mechanism adapted to disengage said clutch, means adapted to connect said mechanisms on rotation of said spool or said handle to pay out line, said means comprising a pair of rotatable members and one way clutches adapted to interlock said members, one of said members being carried by each of said mechanisms, a brake adapted to hold said rotating member in said first named mechanism motionless, a member slidably carried by said rotatable member in said second named mechanism, said brake and said slidable member having interengaging cam surfaces effective on connection of said mechanisms to lock said slidable member to said brake and to actuate said brake to hold said mechanisms motionless, means to restore said second named mechanism when said handle is rotated to reel in said line, and means to adjust said slidable member to permit said cam interlock to be effected as desired whereby said second named mechanism will control said main clutch as desired.

WILLIAM G. LA PIERRE.